United States Patent [19]

Segerson

[11] Patent Number: 5,007,702
[45] Date of Patent: Apr. 16, 1991

[54] FIBER OPTIC CABLE RETAINER

[76] Inventor: Eugene E. Segerson, 108 W. Erie, Tempe, Ariz. 85282

[21] Appl. No.: 472,523

[22] Filed: Jan. 30, 1990

[51] Int. Cl.⁵ .............................................. G02B 6/26
[52] U.S. Cl. ............................ 350/96.20; 350/96.21; 357/17; 250/227.11
[58] Field of Search ............... 350/96.20, 96.21, 96.22; 357/17, 19; 250/227

[56] References Cited

U.S. PATENT DOCUMENTS

| | | | |
|---|---|---|---|
| 4,461,537 | 7/1984 | Raymer, II et al. | 350/96.20 |
| 4,479,696 | 10/1984 | Lubin et al. | 350/96.20 |
| 4,533,209 | 8/1985 | Segerson et al. | 350/96.20 |
| 4,626,067 | 12/1986 | Watson | 350/96.20 |
| 4,826,272 | 5/1989 | Pimpinella et al. | 350/96.20 |
| 4,863,232 | 9/1989 | Kwa | 350/96.20 |
| 4,911,519 | 3/1990 | Burton et al. | 350/96.20 |
| 4,916,497 | 4/1990 | Gaul et al. | 357/19 |
| 4,927,228 | 5/1990 | Van De Pas | 350/96.20 |
| 4,945,400 | 7/1990 | Blonder et al. | 357/74 |
| 4,948,222 | 7/1990 | Croke et al. | 350/96.20 |

OTHER PUBLICATIONS

"Progress in the FC Connector", FPN, Nov. 1989, p. 28.
"Fitting Provide Leak-Tight Tube Connections", Laser and Optronics, Oct. 1989, p. 87.

*Primary Examiner*—Akm Ullah
*Attorney, Agent, or Firm*—Robert M. Handy

[57] ABSTRACT

A fiber optic cable connection having easy cable insertion and greater pull strength is obtained by providing a cable connector (30) embodying a tapered, partially split sheath (38) around the cable (18) in a tapered hole (36) in the connector body (32) and a compression nut (34) for adjusting the compression of the partially split sheath (38). When the cable (18) is inserted, springy legs (42) on the tapered sheath (38) bend apart to allow easy insertion. When an attempt is made to withdraw the cable (18) ends (44) of legs (42) bite into the cable, resisting removal. The compression nut (34) permits disassembly of the connector (30) if desired and allows adjustment of the cable clamping force. The tapered sheath (38) may be easily removed without damage to the cable (18).

15 Claims, 1 Drawing Sheet

FIBER OPTIC CABLE RETAINER

Field of the Invention

This invention concerns electro-optical assemblies and, more particularly, an improved connector for coupling electro-optical cables and device.

Background of the Invention

Electro-optical devices and assemblies are well known in the art. It is known to couple electro-optical emitters and detectors to optical cables for transmitting and receiving information and to connect cables to each other. Generally the optical cables consist of a central optical fiber or bundle of fibers surrounded by an outer protective covering. In order to have efficient optical coupling between the electro-optical element and the optical cable, the optical fiber must be precisely aligned to the electro-optical element and held firmly in place so that it does not move during use.

In the prior art this has been accomplished typically using connectors of the type illustrated in FIG. 1. Prior art electro-optical connector 10 comprises body 12, typically of plastic, containing electro-optical element 14 (e.g., an emitter or detector) with electrical leads 16, optical cable 18 of diameter 19 having outer protective covering 20 and internal optical fiber 22 which buts against electro-optical element 14 in a precise manner determined by body 12. Compression nut 24 typically has deformable protrusion 26 which engages tapered recess 28 in body 12 so that when nut 24 is screwed onto body 12 using threads 25, 27, protrusion 26 is compressed around cable 18 by the wedging action of tapered recess 28. In some cases, protrusion 26 may be a separate piece (e.g., a deformable ferrule) rather than being integral with nut 24. The latter arrangement is commonly used in connection with coupling metal or plastic tubing and is well known to have the disadvantage that the ferrule permanently deforms during installation and frequently cannot be removed from the cable thereafter or reused should disassembly be necessary.

Under many circumstances the prior art arrangements work well. However, they suffer from a number of disadvantages that limit their usefulness under more demanding applications. For example, the pull force that can be exerted on cable 18 after connector 10 is assembled without significantly disturbing the coupling between fiber 22 and electro-optical element 14 or without pulling cable 18 out of connector 10 is often less than desired. Further, it is difficult to maintain precise alignment or spacing of the optical fiber and electro-optical element during assembly because the optical cable is not held firmly in place until after nut 24 is tightened. Hence, the cable can slip away from contact with electro-optical element 14 during assembly. The same problem exist when two cables are being joined. Further, if compression region or ferrule 26 of nut 24 deforms during assembly, it may not be possible to remove it from the cable without cutting off the cable. This is a substantial disadvantage when repair is necessary. Accordingly, a need continues to exist for improved electro-optical connectors that overcome these and other deficiencies of the prior art.

BRIEF SUMMARY OF THE INVENTION

It is an object of the present invention to provide an improved fiber optic device characterized by a body portion, a retainer of a springy material and a locking portion, wherein the body portion has an opening therein extending from an exterior of the body portion to an internal electro-optical component (or another optical fiber) for admitting the fiber optic cable, wherein an outer part of the opening nearest the exterior is larger than an interior part of the opening, wherein the retainer comprises an at least partially split sheath around the cable in the outer part of the opening, wherein the sheath has an interior diameter at a first end oriented toward the interior part of the opening slightly smaller than the cable and an interior diameter at an opposite end larger than the cable so that when the cable is pushed through the sheath toward the interior the smaller end of the sheath expands slightly to allow passage of the cable and when an attempt is made to retract the cable the smaller end of the sheath bites into the cable thereby restricting movement in that direction, and wherein the locking portion is coupled to the body portion and presses against the retainer to adjust the cross-section of the interior end of the sheath where it grips the cable. It is desirable that the outer part of the opening is tapered with the larger cross-section near the exterior.

The sheath may have the form of a split sleeve or a spider-like arrangement with two or more legs folded in toward the cable. The spider-like arrangement is preferred and comprises an annular central portion with a hole therein larger than the cable cross-section for admitting the cable, and multiple leg portions having first ends joined to the central portion and distal ends extending away from the central portion and inwardly bent to form the smaller end of the sheath and with an interior cross-section smaller than the cable cross-section. It is desirable that the inwardly bent distal ends of the leg portions have edges pointed toward the cable for pressing against the cable and that the distal ends and edges be oriented such when the cable is pushed into the device, the cable slides past the edges and when the cable is pulled back, the edges are forced into the cable.

As used herein the words "electro-optical element", whether singular or plural, are intended to include any element or object providing or receiving light, as for example, but not limited to, one or more emitters, one or more detectors, one or more optical fibers or combinations thereof.

BRIEF DESCRIPTION OF THE DRAWINGS

Where practical, the same identifying numbers are used to indicate similar elements or regions in the figures. Primes indicate equivalent elements having the same function but slightly varying configuration in different embodiments.

DETAILED DESCRIPTION OF THE DRAWINGS

Figure 1:
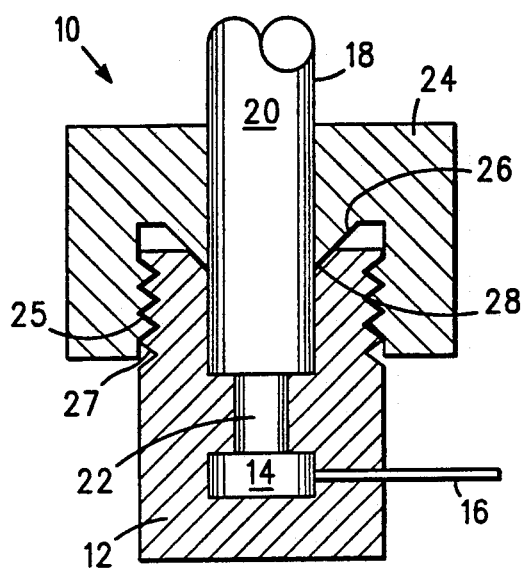
FIG. 1 is a simplified partial cut-away and cross-sectional view of an electro-optical connector according to the prior art.
Figure 2:
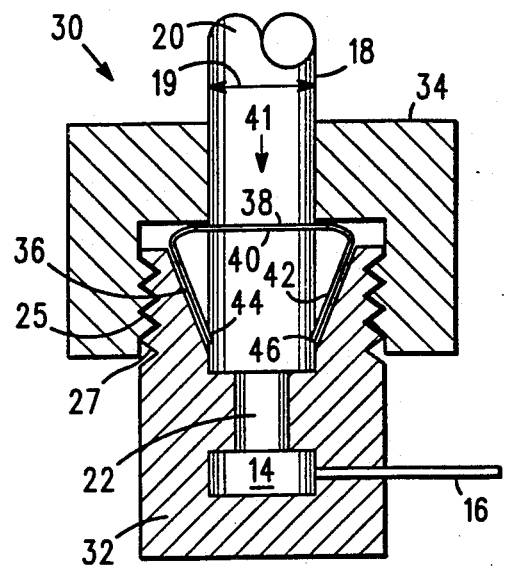
FIG. 2 is a simplified partial cut-away and cross-sectional view of an electro-optical connector according to a first embodiment of the present invention.

FIGS. 2-7 illustrate the present invention. Referring now to FIG. 2, improved connector 30 comprises body 32 analogous to body 12 and nut or cap 34 analogous to nut 24, desirably coupled by screw threads 25, 27. An opening is provided in body 32 to accommodate optical cable 18 of diameter 19 having outer protective covering 20 and internal optical fiber 22 whose end abuts electro-optical element 14 having leads 16. Cap or nut 34 has a matching hole to allow passage of cable 18.

Body 32 has tapered portion 36 to accommodate retainer 38. Retainer 38 comprises annular portion 40 having central hole 41 therein for admitting cable 18. Bent-over legs 42 extend from the outer perimeter of annular portion 40 back toward cable 18 and have ends 44 that engage cover 20 on cable 18. The more nut 34 is tightened, using for example screw threads 25, 27, the more ends 44 of retainer 38 are forced into contact with cover 20 by the walls of tapered portion 36. FIG. 2 illustrates the arrangement where retainer 38 is in the form of a spider-like sheath or cage with annular portion 40 joining two inwardly bent, opposed legs 42.

Figure 3:
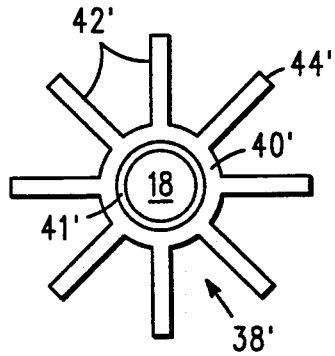
FIG. 3 is a simplified top view of one embodiment of the cable retainer portion of the invented electro-optical connector, during an earlier stage of manufacture and showing further details.
Figure 4:
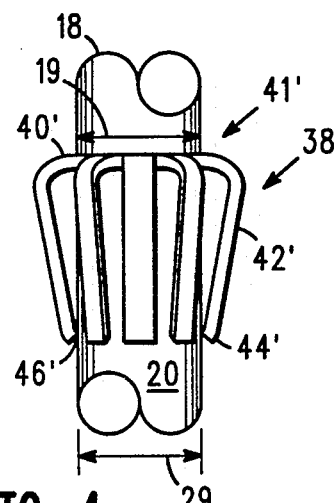
FIG. 4 is a simplified side view of the cable retainer of FIG. 3 after being formed to grip the electro-optical cable and installed on the cable.
Figure 5:
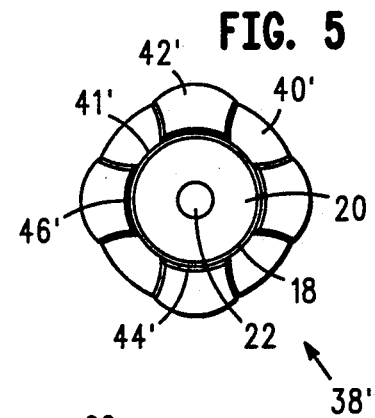
FIG. 5 is a simplified bottom view of a cable retainer according to a further embodiment of the present invention and after being installed on the cable.

While connector 30 is illustrated in FIG. 2 as having retainer 38 comprising two legs 42, other configurations are also useful. FIGS. 3-5 illustrate further embodiments and details of retainer 38. Retainers 38' in FIGS. 3-5 have annular portions 40' from which extend legs 42' each having ends 44' with corners 46' intersecting cover 20 of cable 18. Elements 38' 40', 41', 42', 44' and 46' have the same function as their unprimed counterparts and illustrate slightly different configurations in the different embodiments. References herein to 38, 40, 41, 42, 44, and 46 are intended to include references to their primed equivalent and vice versa.

Those of skill in the art will appreciate that retainer 38' may have any number of legs 42' and outer ends 44' with edges or corners 46'. Legs 42' are joined by annular portion 40' having hole 41' therein for admitting cable 18. It is desirable that the forces exerted on the cable by the legs be comparatively evenly distributed around the circumference of cover 20 of cable 18. Thus, two legs are more desirable than one, three more than two, four more than three and so forth.

FIG. 3 is a top view of a six-legged retainer 38' before legs 42' are bent into the configuration of FIGS. 2 and 4-5. FIG. 3 shows how cable 18 passes through the hole 41' in annular ring 40'. FIG. 4 is a side view showing retainer 38' of FIG. 3 after legs 42' have been bent inwardly to form a cage or basket for enclosing cable 18, with cable 18 inserted therein. FIG. 5 shows a bottom view of a four-legged retainer 38' after insertion of cable 18 and showing how ends 44' with corners 46' engage cable cover 20 around optical fiber 22.

It is desired that legs 42' are desirably bent or formed such that leg ends 44' lightly engage protective cover 20 before being inserted into body 32. This helps insure that legs 42' grip and hold cable 18 in place before nut or cap 34 is tightened. The shape of ends 44' and the location of corners 46' relative to cover 20 affect the ease of installation and holding power. FIG. 2 illustrates an arrangement wherein legs 42 terminate in relatively smooth straight ends 44 having corners 46. FIG. 4 illustrates an arrangement where ends 44' are bent so that corners 46' are slightly inset from the plane of legs 42 toward cover 20. This arrangement has the advantage of providing a determined "bite depth" into cover 20 when legs 42' are squeezed between cover 20 and sloping walls 36 of body 32. FIG. 5 illustrates a preferred variation where legs 42' (which may have either the unbent end configuration of FIGS. 2-3 or the inset end configuration of FIG. 4) and/or ends 44' are formed to be slightly conical or cylindrical when viewed looking along the cable toward ends 44' and corners 46' to match the normally cylindrical shape of cable 18. This is desirable to provide even contact with cable cover 20.

Figure 6:
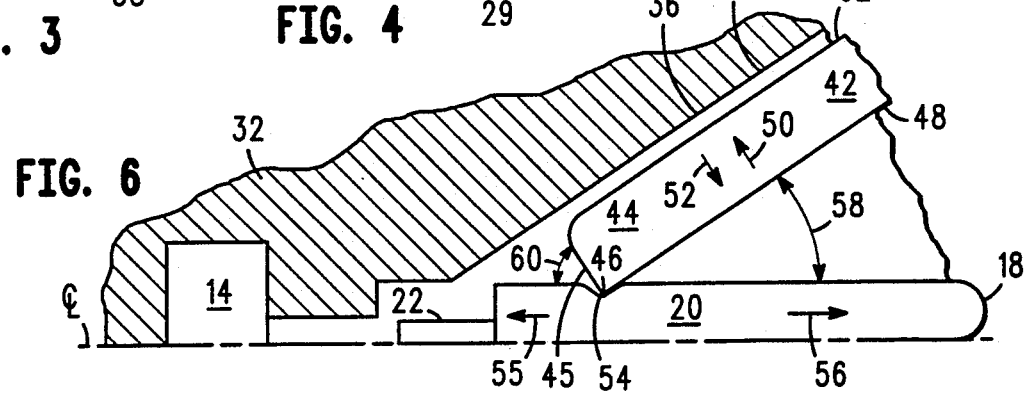
FIG. 6 is an enlarged partial cross-section and cutaway view of a portion of the connector of FIG. 2 showing further detail.

FIG. 6 is a partial cross-section and cut-away side view of part of connector 30 of FIG. 2, much enlarged and showing further details. In FIG. 6, cable 18 with retainer 38 mounted thereon is in the process of being inserted into body 32 in direction 55. Legs 42 of retainer 38 have been desirably formed prior to installation on cable 18 in the manner shown in FIGS. 2-5 so that corners 46 between ends 44 and interior sides 48 of legs 42 lie on a closed figure (e.g., a circle) having a cross-section or at least one transverse dimension smaller than the cross-section or diameter 19 of cable 18. In this way, ends 44 of legs 42 must be sprung slightly apart in the direction of arrow 50 when cable 18 is pushed through retainer 38 in direction 55. This produces a restoring force in the direction of arrow 52 which causes corners 46 of ends 44 to engage cover 20 of cable 18, causing slight depressions 54 therein. This causes enables retainer 38 to hold cable 18 against movement in direction 56 even before nut 34 is tightened.

With the arrangement shown in FIG. 6, it is important that angle 58 between inside face 48 of leg 42 and cable 18 be smaller than angle 60 between face 45 of end 44 and cable 18, near corner 46. The smaller angle 58 the smaller the force required for inserting cable 18 in retainer 38 and the larger angle 60 the greater the force required to pull cable 18 out of retainer 38. If angle 60 is too small, e.g., less than about 45 degrees, then retainer 38 may not hold cable 18 very well during assembly. If angle 60 is too large, e.g., substantially greater than about 100 degrees, then corner 46 will act like a chisel or knife edge and may undesirably cut cable 18. It is desirable that angle 58 be in the range of about 10-50 degrees, conveniently about 25-45 degrees and with about 30-35 degrees preferred and that angle 60 be in the range of about 45-100 degrees, conveniently about 50-90 degrees and with about 60-70 degrees preferred. It is desirable that end 44 and corners 46 be curved in the direction perpendicular to the plane of FIG. 6, as is shown for example in FIG. 5, to match the contour of covering 20 of cable 18 so that substantially uniform contact is obtained between covering 20 and corner or edge 46. This insures that the maximum gripping force is obtained with the least damage to cable 18.

Retainer 38 is aligned on cable 18 by hole 41 and ends 44 of legs 42. Having legs 42 grip cable cover 20 prior to installation in connector 30 insures that cable 18 will not move significantly with respect to retainer 38 during installation and is a particular feature of the present invention. Thus, unlike the prior art arrangement where there was little or nothing to hold cable 18 as nut 24 is being installed, this holding action is now provided by retainer 38.

If retainer 38 is longer in the direction of the cable axis than the depth of tapered region 36, then nut 34 will bear on annular portion 40 of retainer 38 and force retainer 38 further into tapered region 36 as nut 34 is tightened This in turn forces outer surfaces 62 of legs 42 into increasing contact with inside surface 66 of tapered region 36 and pinches legs 42 around cable 18. Thus, the clamping force between cable 18 and retainer 38 may be adjusted by the degree of tightening of nut 34 if that is desired. While use of screw threads 25, 27 is preferred, other means for coupling compression nut 34 well known in the art may also be used. A bayonet type pin and groove locking arrangement is an example of an alternative means for coupling nut or cap 34 and body 32.

Figure 7:
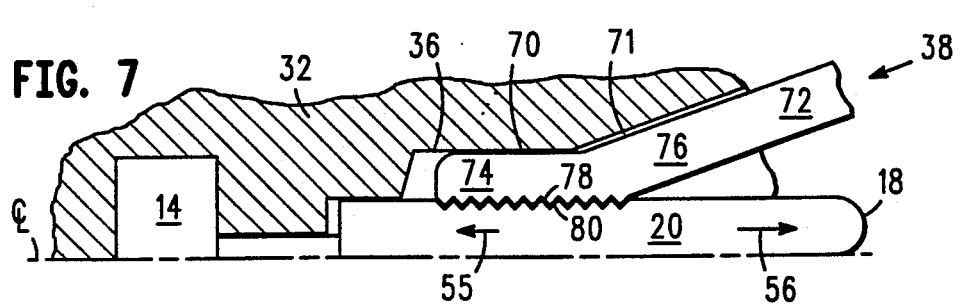
FIG. 7 is an enlarged partial cross-section and cut-away view similar to FIG. 6 but showing a further embodiment of the present invention.

FIG. 7 illustrates a further embodiment of the present invention wherein retainer 38 has legs 72 analogous to legs 42 with end regions 74 analogous to end regions 44. Portions 76 of legs 72 are constructed in the manner previously described for legs 42, but end regions 74 have serrated inner surfaces 78 formed to engage cover 20 of cable 18. In the version shown in FIG. 7, recess 36 of body 32 has portion 70 to accommodate end regions 74 and region 71 to accommodate leg portions 76. As retainer 38 and cable 18 are inserted into connector body 32, legs 72 with ends 74 are compressed around cable 18 by body walls 70 and/or 71 so that serrations 78 bite into cable cover 20 by an amount controlled by the depth of serrations 78, forming corresponding depressions 80 in cover 20. This provides a large area contact and substantially increased gripping strength with reduced risk of unduly cutting into cable cover 20.

Serrations 78 are shown in FIG. 7 as being in the form of small triangular teeth whose sides make approximately equal angles with respect to cable cover 20. This gives approximately equal retention strength to forces in either directions 55, 56. However, the discussion of angles 58 and 60 in connection with FIG. 6 also applies here, where corner 46 of end 44 in FIG. 6 represents the inward corner of a single tooth of end 74 in FIG. 7. By making the angles of the sides of the teeth of serrations 78 unequal in the same manner as described in connection with angles 58, 60 of sides 48, 45 in FIG. 6, the arrangement of FIG. 7 also provides for ease of cable insertion in direction 55 (angle 58 smaller) and increased holding strength to motion in direction 56 (angle 60 larger). Thus, the arrangement of FIG. 7, has all the advantages of the previously described implementations plus greater holding strength and less risk of cutting cable cover 20, and is preferred.

Retainer 38 is desirably constructed of springy metal or plastic. By way of example, for a typical plastic covered optical cable having an outer diameter typically about 1.5 mm, retainer 38 is conveniently constructed of metal spring stock about 0.3 mm thick. Stainless steel, type 1010 or 1020 cold-rolled steel and phosphor bronze are examples of suitable metal spring stock materials. They are conveniently etched or stamped to have a shape such as that illustrated in FIG. 3 with two or more legs, and then formed using means well known in the art to the bent-over shape shown in FIGS. 2 or 4–7 such that dimension 29 (e.g., see FIG. 4) between corners 46' of ends 44' of retainer 38' is less than diameter 19 of cable 18.

Retainer 38 may also be of springy plastic, e.g., Nylon, which is stamped and formed or molded directly in the final desired shape. It is desirable to use slightly thicker material for retainer 38 when of plastic.

The springy nature of the partially split retainer design of the present invention permits the connector to be easily disassembled and the retainer removed without damage to or cutting off cable 18. Annulus 40 around hole 41 through which cable 18 is inserted is not radially compressed so as to permanently engage cover 20 of cable 18, and flexible legs 42, even if deformed, can be easily pried away from the cable so that retainer 38 can be removed. This is unlike the ferrules and tapered compression nuts of the prior art which usually cannot be removed after deformation, and is a particular feature of the present invention.

Unlike most tubing for carrying fluids, there is a substantial tolerance variation in the outer diameter of optical cables. For example, it is common to have the outer diameter of cover 20 vary by as much as twenty percent (e.g., +/−10%) around the nominal value. It is very difficult to accommodate such large variation with the compression cap or ferrule arrangement of the prior art and the holding strength of prior art connectors can vary greatly depending on the exact outer diameter of the particular portion of cable being inserted into the connector. Such large tolerance variations present no problem with the present invention because the split-cone shape of springy retainer 38 and the tapered shape of body recess 36 combine to adjust the internal diameter of retainer legs 42, 72 so they clamp on cables of varying diameter and grip with equal strength irrespective of where the cable diameter falls in its nominal range. This is a particular feature of the present invention.

Having described the present invention, those of skill in the art will appreciate that it provides improved fiber optic assemblies that facilitate easy fiber optic cable insertion, that it automatically holds the cable in place during assembly, that it locks the cable firmly in the connector, that it permits disassembly of the connector and removal of the retainer without cutting off the cable, and that it can readily accommodate cables having wide tolerance variations in their outer diameter while still providing great holding strength. These are substantial advantages of great practical utility.

Further, while the present invention has been illustrated for the situation where a cable is being connected to a photo emitter or photodetector, those of skill in the art will appreciate based on the description herein that the inventive features also apply to connectors intended for coupling two cables with or without any intervening emitting or receiving elements. Also, while the present invention has been described in terms of particular materials and configurations, those of skill in the art will understand based on the description herein that this is merely by way of example for ease of comprehension and that the particular examples and embodiments shown herein are not intended to be limiting and that it is intended to include in the claims that follow the foregoing and such other variations as will occur to those of skill in the art based on the teachings herein.

I claim:

1. A device facilitating unidirectional movement of a fiber optic cable during assembly, comprising, a body portion, a retainer of a springy material and a locking portion, wherein the body portion has an opening therein for admitting the fiber optic cable extending from an exterior of the body portion to an internal electro-optical component, wherein an outer part of the opening nearest the exterior is larger than an interior part of the opening, wherein the retainer resides in the outer part of the opening, wherein the retainer has an interior diameter at a first end oriented toward the interior part of the opening slightly smaller than the cable and an interior diameter at an opposite end larger than the cable so that when the cable is pushed through the retainer toward the interior the smaller end of the retainer expands slightly to allow passage of the cable and when an attempt is made to retract the cable the smaller end of the retainer bites into the cable, and wherein the locking portion is coupled to the body portion and presses against the retainer to adjust the cross-section of the interior end thereof.

2. The device of claim 1 wherein the outer part of the opening is tapered with the larger cross-section near the exterior and wherein the retainer comprises a continuous central portion having a hole therein larger than the cable cross-section for admitting the cable and multiple leg portions having first ends connected to the continuous central portion, wherein the legs have distal ends spaced apart from the central portion and inwardly bent to form the smaller end of the retainer with a transversal separation smaller than the cable cross-section.

3. The device of claim 2 wherein the inwardly bent distal ends of the leg portions have protrusion inwardly oriented toward the cable for engaging the cable.

4. The device of claim 2 wherein the leg portions have distal end portions whose inward faces comprise serrations for engaging the cable.

5. The device of claim 2 wherein the leg portions extend first outward away from the cable, then bend toward the cable so as to intersect the cable at a point displaced from the central portion.

6. A fiber optic device, comprising:
body means having an opening for positioning an optical fiber in proximity to an electro-optical component in the body means to permit coupling therebetween, wherein the opening has a smaller first part proximate the component for accommodating the optical fiber and an at least partly tapered second part extending from the first part to an external wall of the body means for accommodating a protective cover surrounding the optical fiber and a capture means, and wherein the at least partly tapered second part has a first end of a smaller cross-section proximate the first part and a second end of a larger second cross-section remote from the first part;
capture means in the at least partly tapered second part for gripping the protective cover to prevent withdrawal thereof, wherein the capture means has a central portion external to the second part having a hole of a cross-section to admit the protective cover and a leg portion internal to the second part extending toward the first end thereof and inwardly directed for engaging the protective cover; and
compression means for engaging the body means and forcing the capture means into the tapered second part so that a part of the leg portion of the capture means is forced against the protective cover by contact with the at least partly tapered second part.

7. The device of claim 6 wherein the capture means is formed of metal with a substantially annular central portion from which radiates one or more legs whose end portions having interior faces making an interior angle of 10–50 degrees with respect to the protective cover.

8. The device of claim 6 wherein the capture means is formed of a thin springy material having a central annular region with a hole therethrough for admitting the protective cover containing the optical fiber at substantial right angles to the central portion and having a peripheral leg portion attached to the central portion and extending therefrom in a direction substantially aligned with a longitudinal axis of the optical fiber.

9. The device of claim 8 wherein the peripheral leg portion extends first away from and then back toward the axis of the optical fiber.

10. The device of claim 6 further comprising an electro-optical component within the body means in proximity to an end of the optical fiber.

11. A device for retaining a fiber optic cable having a central optical fiber and a protective outer cover,
a body for locating an electro-optical element in optical communication with an end of the central optical fiber, wherein the body has an opening extending from outside the body to the electro-optical element with an interior part for accommodating the central optical fiber and an at least partially tapered anterior part between the interior part and the outside for accommodating the outer cover and a cable retaining means, wherein the anterior part of the opening has a larger cross-section nearer the outside;
cable retaining means comprising a springy spider with a central portion having a central hole for accommodating the cable and bent over legs extending from the central portion toward the interior part for gripping the outer cover when compressed toward the cable by contact at least with a sloping wall of the tapered anterior part of the body opening; and
compression means coupled to the body for forcing the legs of the cable retaining means into the anterior part in contact with the sloping wall of the tapered anterior part.

12. The device of claim 11 wherein the springy spider comprises at least two opposed legs.

13. The device of claim 11 wherein the springy spider comprises multiple evenly spaced legs.

14. The device of claim 13 wherein the legs have ends which are curved so as to have a conical or cylindrical shape of a minimum interior diameter smaller than an outer diameter of the protective outer cover.

15. The device of claim 13 wherein the multiple evenly spaced legs have ends remote from the central portion which when compressed together substantially form a truncated cone whose minimum cross-section has an interior circumferences less than the circumference of the protective outer cover.

* * * * *